(12) United States Patent
Zogg et al.

(10) Patent No.: US 9,044,118 B2
(45) Date of Patent: Jun. 2, 2015

(54) BREWING UNIT FOR COFFEE BREWING

(75) Inventors: David Zogg, Untersiggenthal (CH); Sipke Theo Douma, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 388 days.

(21) Appl. No.: 13/500,974

(22) PCT Filed: Oct. 5, 2010

(86) PCT No.: PCT/IB2010/054495
§ 371 (c)(1),
(2), (4) Date: Apr. 9, 2012

(87) PCT Pub. No.: WO2011/045710
PCT Pub. Date: Apr. 21, 2011

(65) Prior Publication Data
US 2012/0199009 A1     Aug. 9, 2012

(30) Foreign Application Priority Data

Oct. 14, 2009  (EP) .................................... 09172968

(51) Int. Cl.
*A47J 31/00* (2006.01)
*A47J 31/46* (2006.01)
*A47J 31/44* (2006.01)

(52) U.S. Cl.
CPC .............. *A47J 31/46* (2013.01); *A47J 31/4496* (2013.01)

(58) Field of Classification Search
USPC ..................... 99/295, 299, 293, 302 R, 323.1
See application file for complete search history.

(56) References Cited

U.S. PATENT DOCUMENTS

| | | | |
|---|---|---|---|
| 5,255,593 A | 10/1993 | Bunn et al. | |
| 6,401,729 B1 | 6/2002 | Ford | |
| 6,412,394 B2 * | 7/2002 | Bonanno | ......................... 99/299 |
| 6,799,504 B2 | 10/2004 | Brouwer | |
| 8,039,034 B2 | 10/2011 | Ozanne | |
| 2006/0156928 A1 | 7/2006 | Wang | |
| 2007/0012194 A1 | 1/2007 | Oehninger | |
| 2007/0056994 A1 | 3/2007 | Woodnorth et al. | |
| 2008/0216663 A1 | 9/2008 | Williamson | |
| 2008/0276807 A1 * | 11/2008 | Righetti | ...................... 99/289 R |

FOREIGN PATENT DOCUMENTS

| | | |
|---|---|---|
| CN | 101524243 A | 9/2009 |
| EP | 1690479 A1 | 8/2006 |
| EP | 2077086 A1 | 7/2009 |
| WO | 0164088 A1 | 9/2001 |
| WO | 2005077231 A1 | 8/2005 |
| WO | 2006033049 A1 | 3/2006 |

* cited by examiner

*Primary Examiner* — Reginald L Alexander

(57) ABSTRACT

A brewing unit used in a beverage maker is adapted to make a beverage based on an interaction between a beverage extract and an extracting fluid, and includes a chamber that can receive and accommodate a quantity of beverage extract, a lid that is movable between an open and closed state for opening and closing the chamber, and an outlet for letting out fluid from the chamber. The outlet includes a first outlet passage and restrictor for restricting an outlet flow in the first outlet passage, and a second outlet passage. The brewing unit further includes a controller device for interacting with the lid so as to block the outlet flow to the second outlet passage when the lid is in the closed state and to allow a free outlet flow from the chamber to the second outlet passage when the lid is in the open state.

16 Claims, 1 Drawing Sheet

BREWING UNIT FOR COFFEE BREWING

FIELD OF THE INVENTION

The present invention relates to a brewing unit for use in a beverage maker which is adapted to make a beverage on the basis of interaction between a beverage extract and an extracting fluid, the brewing unit comprising chamber for receiving and accommodating a quantity of beverage extract, a lid movable between an open and closed state for opening and closing the chamber, and outlet means for letting out fluid from the chamber, wherein the outlet means comprise a first outlet passage and means for restricting an outlet flow in the first outlet passage.

The present invention furthermore relates to a beverage maker which is adapted to make a beverage on the basis of interaction between a beverage extract and an extracting fluid, comprising a brewing unit as mentioned.

BACKGROUND OF THE INVENTION

A well-known example of a beverage maker which is adapted to make a beverage on the basis of interaction between a beverage extract and an extracting fluid is an espresso appliance. In general, such an appliance is used for making espresso by forcing hot water to flow through a quantity of ground coffee beans.

The espresso appliance has a so-called brewing chamber where the actual espresso-making process takes place during operation of the appliance. In particular, the brewing chamber is openable in order to allow the introduction of fresh quantities of ground coffee beans and the removal of used quantities of ground coffee beans, and closeable in order to allow a process during which a necessary pressure is built up inside the brewing chamber.

The quality of espresso is determined by various factors. The formation of a so-called crema layer is a good indicator of an espresso-making process with correct parameters. A crema layer is a thin layer of foam on top of the espresso fluid.

It is possible to create an artificial crema layer if so desired in certain situations. To this end, means like a check valve or a restrictor are applied downstream of a position in the brewing chamber where the beverage extract can be located, i.e. at an outlet side of the chamber. The valve or restriction has a function in raising the pressure prevailing inside the brewing chamber during the espresso-making process, and in creating a jet of freshly made espresso against the inside of an outlet tube, as a result of which foam is created.

A disadvantage of applying a valve or restriction as mentioned in the foregoing is that more water stays behind in the brewing chamber once an espresso-making process is finished. This is bothersome to a user of the espresso appliance, especially in cases where the ground coffee beans come in coffee pods, because wet pods are difficult to remove from the brewing chamber.

SUMMARY OF THE INVENTION

It is an object of the present invention to provide a solution to the problem of water staying behind in the brewing chamber as a consequence of the use of a valve or restriction for creating an artificial crema layer. Preferably, the solution does not require any additional action of a user. According to the present invention, a suitable solution is found by providing a brewing unit for use in a beverage maker, wherein the outlet means of the brewing unit further comprises a second outlet passage and wherein the brewing unit further comprises means interacting with the lid so as to block the outlet flow to the second outlet passage when the lid is in a closed state and to allow a free outlet flow from the chamber to the second outlet passage when the lid is in an open state.

In a brewing unit according to the present invention, an additional second outlet passage is provided, so that fluid which would otherwise stay behind in the brewing chamber after a beverage-making process, due to the restriction of the first outlet passage, can now flow from the brewing chamber after all, wherein the second outlet passage functions as a bypass of the first outlet passage when the lid is moved to an open state. A special feature of the brewing unit according to the present invention is the fact that the means are arranged to block the second outlet passage when the lid is closed. In this way, situations in which fluid by-passes the first outlet passage during a beverage-making process are avoided. In the case where the brewing unit is used for making espresso, for example, and the first outlet passage has a function in creating an artificial crema layer, it is important that freshly made espresso is only allowed to flow through the first outlet passage, and that the pressure prevailing inside the brewing chamber during an espresso-making process is not reduced.

The solution according to the present invention only requires the application of an additional outlet passage and means interacting with the lid so as to block the outlet flow to the second outlet passage when the lid is in a closed state and to allow a free outlet flow from the chamber to the second outlet passage when the lid is in an open state. The means for controlling access to the additional outlet passage via the movement of the lid can be realized in any suitable manner, wherein it is possible to employ means which do not require activation by a user.

According to a preferred option existing within the scope of the present invention, the means for controlling access to the second outlet passage comprise a valve, and supporting means for supporting a quantity of beverage extract in the chamber, wherein the supporting means are mechanically coupled to a closing element for closing the valve, and wherein the lid and the supporting means are arranged such that the supporting means closes the valve by means of the closing element when the lid is moved to a closed state. This provides an effective design for the means controlling the outlet flow to the second passage.

The inclination of the valve to assume the open position may be enhanced by applying means for biasing the supporting means to a position for opening the valve, so that it is ensured that the second outlet passage is freely accessible as soon as the lid moves to an open state and the pressure on the supporting means is released. The biasing means may comprise a resilient member such as a coil spring or another suitable spring or combination of springs. In particular it is preferred when the chamber is arranged to accommodate a coffee capsule or coffee pod that is supported by the supporting means during use, and wherein, during use, the lid upon moving to a closed state presses on the coffee pod or capsule by which action the supporting means close the valve by means of the closing element. This provides an efficient design.

It is noted that it is possible that the means for restricting an outlet flow in the first outlet passage comprise a valve, which opens during use when the chamber is pressurized. On the basis of the use of such a valve, the pressure prevailing inside the brewing chamber during a beverage-making process can be optimal, and the same applies to the formation of foam in an outlet flow of beverage.

The above-described and other aspects of the present invention will be apparent from and elucidated with reference to the following detailed description of a beverage making unit according to the present invention.

BRIEF DESCRIPTION OF THE DRAWINGS

The present invention will now be explained in greater detail with reference to the Figures, in which equal or similar parts are indicated by the same reference signs, and in which.

DETAILED DESCRIPTION OF EMBODIMENTS

Figure 1:
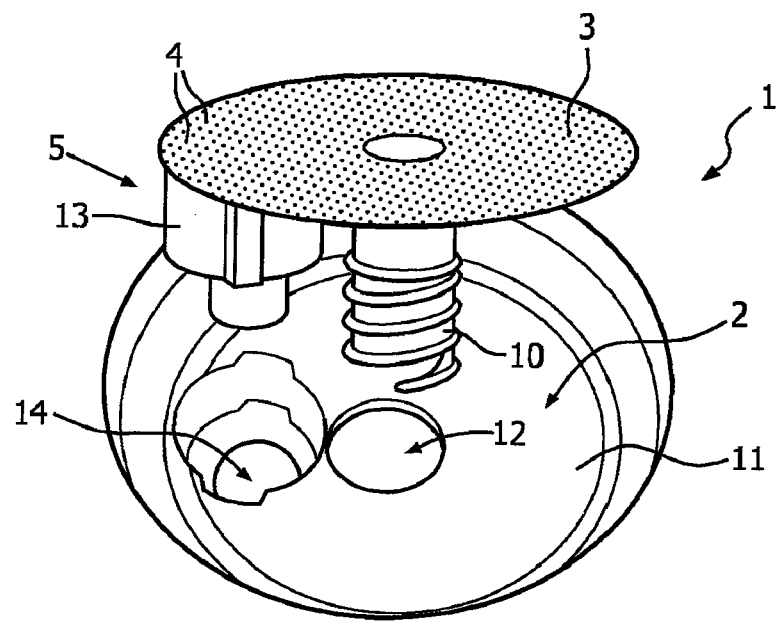
FIG. 1 diagrammatically shows components of a brewing unit according to the present invention, in a three-dimensional sketch.
Figure 2:
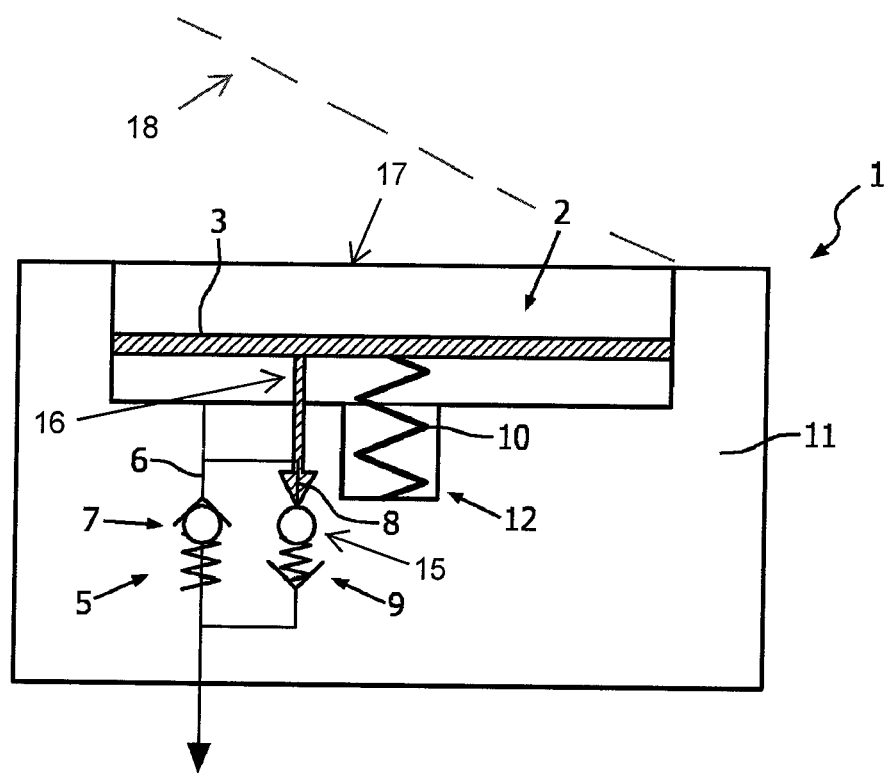
FIG. 2 also shows components of the brewing unit according to the present invention, and illustrates the functioning of means for letting out fluid from a chamber of the brewing unit.

FIGS. 1 and 2 diagrammatically show components of a brewing unit 1 according to the present invention, which is intended to be used in a beverage maker for making a beverage on the basis of interaction between a beverage extract and an extracting fluid. In the shown example, the brewing unit 1 is particularly suitable to be used in an espresso appliance for making espresso on the basis of interaction between a quantity of ground coffee beans or a coffee capsule or a coffee pod and hot water. The general concept of such a beverage maker is well-known and is not further elucidated here. For the sake of completeness, it is noted that the present invention is not restricted to the field of espresso appliances.

Like known brewing units for use in an espresso appliance, the brewing unit 1 comprises a chamber 2 for receiving and accommodating a quantity of ground coffee beans. The chamber 2 is openable and closeable by means of a lid 17. In an open state of the chamber 2, a fresh quantity of ground coffee beans or a coffee capsule/pod may be introduced into the brewing unit 1, or a used quantity of ground coffee beans may be removed from the brewing unit 1. When the lid is closed a process of conducting hot water through a quantity of ground coffee beans may be performed, wherein a pressure that is needed in the process may be built up.

Preferably the lid 17 is hingeably arranged on a top side of the chamber 2 for hingedly moving to another position 18 shown by dashed lines in FIG. 2.

In the shown example, a sieve 3 for supporting a quantity of ground coffee beans is arranged on a bottom side of the chamber 2. The sieve 3 is provided with holes 4 for allowing fluid, in particular freshly made espresso, to be discharged from the chamber 2.

For the purpose of letting out fluid from the chamber 2, the brewing unit 1 is equipped with suitable outlet means 5. The outlet means 5 comprise a main outlet passage 6, which is provided with a valve 7 for restricting the outlet passage 6. In the context of making espresso, the restriction has at least two important functions, namely ensuring the formation of a crema layer, and minimizing the reducing effect of the presence of the main outlet passage 6 on the pressure prevailing inside the chamber 2 during an espresso making process. In the field of espresso appliances, in view of the first function, the valve 7 is often referred to as crema valve. For the sake of clarity, this term will be used in this description as well.

The crema valve 7 may be realized in any suitable way. In the shown example, the crema valve 7 is a spring-loaded valve, particularly a normally closed valve. During an espresso making process, the normally closed valve is forced to assume an open position under the influence of the pressure exerted during the process. Consequently, it is possible for freshly made espresso to pass the crema valve 7 and flow further away from the chamber 2, in the direction of a suitable receptacle (not shown) for receiving the espresso.

A problem associated with the use of the crema valve 7 is that water stays behind in the chamber 2 when an espresso-making process is finished. As soon as the pressure is released, for example, because the lid is opened by a user, the crema valve 7 is in a closed position, and water that happens to be still inside the chamber 2 has no possibility of flowing out of the chamber 2. One reason why this is regarded as a problem is the fact that the wetter a used quantity of ground coffee beans or a coffee capsule/pod is, the more difficult it is to remove it from the chamber 2.

According to the present invention, a solution to the above-described problem is found without a need to change the functioning of the main outlet passage 6 and the crema valve 7. The solution resides in the fact that the outlet means 5 comprise an additional second outlet passage 8, which may be used as a bypass of the main outlet passage 6 when the lid is moved to an open state for the purpose of removal of a used quantity of ground coffee beans or a coffee capsule/pod. The bypass offers the advantage that water is allowed to flow out of the chamber 2 in spite of the closed state of the crema valve 7 and the main outlet passage 6 when the lid is opened.

However, only adding a bypass would cause problems during the espresso-making process, as the presence of the bypass would cause the pressure prevailing inside the chamber 2 to drop, and would thus prevent a quantity of freshly made espresso from flowing through the main outlet passage 6, so that the extent to which crema is formed would be reduced. These disadvantages do not occur when the present invention is applied, as the present invention furthermore proposes to provide the brewing unit 1 with means interacting with the lid so as to block the outlet flow to additional outlet passage 8 when the lid in a closed state. In the shown example, these means comprise a valve 9, which will hereinafter be referred to as bypass valve 9.

FIG. 2 clearly illustrates the positioning of the two outlet passages 6, 8 and the two valves 7, 9 arranged therein. The valves 7, 9 are arranged in parallel with respect to each other, while each of the valves 7, 9 is arranged in series with the chamber 2. According to an advantageous possibility, a component of the bypass valve 9 is coupled to the sieve 3 which is used for supporting a quantity of ground coffee beans, so that a state of the bypass valve 9 is determined by a position of the sieve 3. Preferably the sieve 3 is coupled to a closing element 15 of the valve by means of a rod 16 that presses on the closing element 15 when the sieve moves downward. The closing element 15 may be a ball accommodated in a ball seat. In this respect, it is noted that the position of the sieve 3 inside the chamber 2 is variable to some extent. To this end, in the shown example, the sieve 3 is arranged on a coil spring 10, wherein the sieve 3 is located at one end of the spring 10, and wherein another end of the spring 10 is supported by a surface of a body 11 of the brewing unit 1. Furthermore, the spring 10 is guided in a hole 12 which is present inside the body 11 for accommodating the spring 10. It is noted that for the sake of clarity, in FIG. 1, the whole of sieve 3, outlet means 5 and spring 10 is shown at some distance with respect to the body 11, so that it can be seen how the spring 10 is inserted into the hole 12 as mentioned, and how the outlet means 5 are accommodated in a housing piece 13 which is inserted into another hole 14 of the body 11.

The functioning of the brewing unit 1 is described in the following, starting from a situation in which the brewing unit 1 is loaded with a quantity of ground coffee beans, after which an espresso-making process is performed.

Initially, the lid is in an open state, and the sieve 3 is at a highest level as illustrated in FIG. 2. The dimensions of the chamber 2 are chosen such that when a coffee capsule or coffee pod is provided on the sieve 3, and the lid is moved to a closed state, the sieve 3 is pressed downwards, against the action of the spring 10. When the sieve 3 is at the lower level, the bypass valve 9 is in the closed position. Thus, when all components of the brewing unit 1 are in a position for the espresso-making process, the bypass valve 9 is closed, and the process can take place in the same way as in known brewing units 1 in which there is no additional outlet passage 8. It may also be that the lid is directly linked with the sieve, for example by means of a bar pressing on the sieve 3 when the lid is closed.

During the espresso-making process, the espresso flows out of the chamber 2 through the main outlet passage 6. When the process is finished and the lid is opened for removal of the used quantity of ground coffee beans, the pressure on the sieve 3 is released, as a result of which the sieve 3 is moved back to the highest level under the influence of the spring 10, and, to a lesser extent, under the influence of a spring component of the bypass valve 9. In the process, the bypass valve 9 is allowed to assume its normal state, i.e. an open state. As a result, excess water that is present inside the chamber 2 can be discharged from the chamber 2 after all, namely through the additional outlet passage 8, and the used quantity of ground coffee beans or a wet coffee pod can be as dry as possible. In FIG. 2, a bypass fluid flow in the brewing unit 1, i.e. a flow of fluid passing through the additional outlet passage 8 and leaving the body 11, is indicated by means of arrows.

All in all, it follows from the foregoing that by applying an additional outlet passage 8 and a bypass valve 9, it is achieved that excess water from an espresso-making process is allowed to flow out of the chamber 2 when the chamber 2 is in the open state, while a path through the main outlet passage 6 is still the only path that is available to fluid during the espresso-making process. Furthermore, no additional measures are needed for guaranteeing that a certain pressure level prevails in the chamber 2 during the espresso-making process, which is another advantage of the additional outlet passage 8 being automatically blocked by the bypass valve 9 throughout that process.

In the brewing unit 1 as shown, when the bypass valve 9 is in the open state, fluid flows out of the chamber 2 and through the additional outlet passage 8 under the influence of gravity. If so desired, it is possible to have additional means for performing a sucking action on fluid present in the chamber 2, through the additional outlet passage 8, in order to enhance the fluid removal process.

In the shown example, the spring 10 plays a role in pushing the bypass valve 9 to the normal, open position as soon as the chamber 2 is opened and the pressure on the sieve 3 is released. Within the scope of the present invention, any other suitable means for performing the function as mentioned may be applied in the brewing unit 1 as well. For the sake of completeness, it is noted that the application of the spring 10 or any other means is not essential, although such application is preferred in view of the fact that it helps in letting the bypass valve 9 return to the normal, open position when the pressure is released.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the Figures and the description, such illustration and description are to be considered illustrative or exemplary, rather than restrictive. The present invention is not limited to the disclosed embodiments.

Variations to the disclosed embodiments can be understood and effected by a person skilled in the art in practicing the claimed invention, from a study of the Figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The present invention can be summarized as follows. A brewing unit 1 for use in a beverage maker which is adapted to make a beverage on the basis of interaction between a beverage extract and an extracting fluid comprises an openable and closeable chamber 2 for receiving and accommodating a quantity of beverage extract, and outlet means 5 for letting out fluid from the chamber 2. The outlet means 5 comprise a first outlet passage 6 and means 7 for restricting an outlet flow in the first outlet passage 6, and furthermore comprise a second outlet passage 8 arranged in parallel with the first outlet passage 6 and means 9 for blocking the second outlet passage 8 when the chamber 2 is loaded with beverage extract and in a closed state, and for allowing free access from the chamber 2 to the second outlet passage 8 in other situations, including situations in which the chamber 2 is in an open state.

The present invention is very much suitable to be applied in the field of espresso making In this field, the means 7 for restricting an outlet flow in the first outlet passage 6 have a function in creating artificial crema. In the first place, the presence of the restricting means 7 allows a higher pressure in the chamber 2 during an espresso-making process, compared to a situation in which such means 7 would not be present. In the second place, the restricting means 7 creates a jet of fluid that splashes against an inside of the first outlet passage 6, causing the creation of foam. However, the restricting means 7 cause excess fluid to stay behind in the chamber 2 once an espresso-making process is finished and pressures are released, as a result of which it is difficult for a user to remove a used quantity of ground coffee beans, which may be supplied in a pod, for example. When the present invention is applied, a bypass of the first outlet passage 6 is created, so that it is possible after all to remove any originally remaining fluid from the chamber 2.

The invention claimed is:

1. A brewing unit for use in a beverage maker which is configured to make a beverage based on an interaction between a beverage extract and an extracting fluid, the brewing unit comprising:

a chamber for receiving and accommodating a quantity of the beverage extract;

a lid configured to move between an open state and a closed state for opening and closing the chamber; and outlet means for letting out the extracting fluid from the chamber, wherein the outlet means comprise a first outlet passage (6) and means for restricting an outlet flow in the first outlet passage, wherein the outlet means further comprise a second outlet passage, and wherein the brewing unit further comprises means interacting with the lid configured to block the outlet flow to the second outlet passage from the chamber when the lid is in the closed state and configured to allow a free outlet flow from the chamber to the second outlet passage when the lid is in the open state.

2. The brewing unit according to claim 1, wherein the means for interacting with the lid comprise a valve, and supporting means for supporting the quantity of the beverage extract in the chamber, wherein the supporting means are mechanically coupled to a closing element for closing the valve, and wherein the lid and the supporting means are configured to position the closing element to close the valve when the lid is moved to the closed state.

3. The brewing unit according to claim 2, further comprising means for biasing the supporting means to a position where the valve is open.

4. The brewing unit according to claim 3, wherein the chamber is configured to accommodate a coffee capsule or a coffee pod that is supported by the supporting means during use of the brewing unit, wherein, during use, the lid upon moving to the closed state presses on the coffee pod or coffee capsule, and
wherein, during use, the lid and the supporting means are configured to position the closing element to close the valve when to the lid is moved to the closed state and presses on the coffee pod or coffee capsule supported by the supporting mean.

5. The brewing unit according to claim 1, wherein the means for restricting the outlet flow in the first outlet passage comprise a valve which opens during use of the brewing unit when the chamber is pressurized.

6. The brewing unit of claim 2, wherein the chamber is configured to accommodate a coffee capsule or a coffee pod that is supported by the supporting means during use of the brewing unit, wherein, during use, the lid upon moving to the closed state presses on the coffee pod or coffee capsule, wherein, during use, the lid and the supporting means are configured to position the closing element to close the valve when to the lid is moved to the closed state and presses on the coffee pod or coffee capsule supported by the supporting means, and wherein the valve and a further valve are arranged in parallel with each other, and wherein the valve and the further valve are arranged in series with the chamber.

7. The brewing unit of claim 5, wherein a position of the supporting means inside the chamber is variable, wherein the supporting means is positioned at a high level when the lid is in the open state, and wherein the supporting means is positioned at a lower level lower than the high level when the lid is in the closed state and presses on the coffee pod or coffee capsule supported by the supporting means.

8. A beverage maker which is adapted to make a beverage on the basis of interaction between a beverage extract and an extracting fluid, comprising a brewing unit comprising:
a chamber for receiving and accommodating a quantity of the beverage extract;
a lid configured to move between an open state and a closed state for opening and closing the chamber; and
outlet means for letting out the extracting fluid from the chamber,
wherein the outlet means comprise a first outlet passage (6) and means for restricting an outlet flow in the first outlet passage,
wherein the outlet means further comprise a second outlet passage, and
wherein the brewing unit further comprises means interacting with the lid configured to block the outlet flow to the second outlet passage from the chamber when the lid is in the closed state and configured to allow a free outlet flow from the chamber to the second outlet passage when the lid is in the open state.

9. A brewing unit for use in a beverage maker that makes a beverage based on an interaction between a beverage extract and a fluid, the brewing unit comprising:
a chamber for receiving and accommodating the beverage extract;
a lid configured to move between an open state and a closed state for opening and closing the chamber;
a first outlet passage for an outlet flow of fluid from the chamber;
a first valve positioned in the first outlet passage for restricting the outlet flow in the first outlet passage;
a second outlet passage for the outlet flow in the second outlet passage;
a second valve positioned in the second outlet passage which closes during use of the brewing unit;
a sieve positioned in the chamber for supporting the beverage extract in the chamber, wherein the sieve is provided with holes for allowing fluid to be discharged from the chamber into at least one of the first outlet passage and the second outlet passage;
wherein the lid and the sieve are configured to block the outlet flow to the second outlet passage from the chamber when the lid is in the closed state and configured to allow a free outlet flow from the chamber to the second outlet passage when the lid is in the open state.

10. The brewing unit of claim 9, wherein a position of the sieve inside the chamber is variable.

11. The brewing unit of claim 9, wherein the sieve is coupled to a closing element of the second valve by a rod that presses on the closing element when the sieve moves downward.

12. The brewing unit of claim 9, further comprising a biasing member that is configured to bias the sieve to a position for opening the second valve for allowing the free outlet flow from the chamber to the second outlet passage when the lid is moved to the open state and a pressure on the sieve is released, and is configured to bias the sieve to a position for closing the second valve for blocking the outlet flow to the second outlet passage when the lid is in the closed state and presses on the beverage extract in the chamber.

13. The brewing unit of claim 12, wherein the sieve is positioned at a highest level when the lid is in the open state, and wherein the sieve is positioned at a lower level lower than the highest level when the lid is in the closed state and presses on the beverage extract in the chamber.

14. The brewing unit of claim 12, wherein the biasing member is a coil spring.

15. The brewing unit of claim 9, wherein the first valve opens during use of the brewing unit when the chamber is pressurized.

16. The brewing unit of claim 9, wherein the first valve and the second valve are arranged in parallel with each other to form a parallel combination, and wherein the parallel combination of the first valve and the second valve is arranged in series with the chamber.

* * * * *